(12) United States Patent
Nakayama et al.

(10) Patent No.: US 7,135,137 B2
(45) Date of Patent: Nov. 14, 2006

(54) PROCESS FOR PRODUCING RESIN ROLL

(75) Inventors: Kenjiro Nakayama, Yawata (JP);
Atsuo Watanabe, Hirakata (JP);
Tetsuya Murakami, Hirakata (JP)

(73) Assignee: Yamauchi Corporation, Osaka (JP)

( * ) Notice: Subject to any disclaimer, the term of this patent is extended or adjusted under 35 U.S.C. 154(b) by 234 days.

(21) Appl. No.: 10/491,417

(22) PCT Filed: Sep. 25, 2002

(86) PCT No.: PCT/JP02/10023

§ 371 (c)(1),
(2), (4) Date: Aug. 9, 2004

(87) PCT Pub. No.: WO03/031160

PCT Pub. Date: Apr. 17, 2003

(65) Prior Publication Data

US 2005/0001353 A1 Jan. 6, 2005

(30) Foreign Application Priority Data

Oct. 3, 2001 (JP) ............................. 2001-307192

(51) Int. Cl.
*B29C 65/54* (2006.01)
(52) U.S. Cl. ...................................... 264/262; 156/297
(58) Field of Classification Search ............. 264/262; 156/297
See application file for complete search history.

(56) References Cited

U.S. PATENT DOCUMENTS

| | | | | |
|---|---|---|---|---|
| 5,091,027 A | * | 2/1992 | Watanabe | 156/172 |
| 5,753,165 A | * | 5/1998 | Watanabe et al. | 264/138 |
| 6,030,328 A | * | 2/2000 | Watanabe et al. | 492/56 |
| 6,187,751 B1 | * | 2/2001 | Smith et al. | 514/12 |
| 6,440,347 B1 | * | 8/2002 | Izawa et al. | 264/262 |

FOREIGN PATENT DOCUMENTS

| | | |
|---|---|---|
| JP | 55-31722 B2 | 8/1980 |
| JP | 58-176211 A | 10/1983 |
| JP | 59-58023 A | 4/1984 |
| JP | 62-40476 B2 | 8/1987 |
| JP | 3-47359 B2 | 7/1991 |
| JP | 2805111 B2 | 7/1998 |
| WO | WO 95/17298 A1 | 6/1995 |

* cited by examiner

*Primary Examiner*—Edmund H. Lee
(74) *Attorney, Agent, or Firm*—Birch, Stewart, Kolasch & Birch, LLP

(57) ABSTRACT

A basic manufacturing method of a resin roll includes a procedure in which a synthetic resin outer cylinder (1) molded in the shape of a cylinder is arranged so as to cover an outer surface of a metal core (2), a clearance formed between metal core (2) and outer cylinder 1 is filled with a thermoset adhesive (3), and adhesive (3) is hardened to integrate the constituents into one piece through bonding. The manufacturing method of a resin roll has a feature in that integration of the constituents into one piece through bonding is performed by first hardening of the adhesive in a state where outer cylinder (1) is held at a first temperature and adhesive (3) is thereafter heated at a second temperature higher than the first temperature for second hardening.

8 Claims, 1 Drawing Sheet

PROCESS FOR PRODUCING RESIN ROLL

TECHNICAL FIELD

The present invention relates to a manufacturing method of a resin roll. More specifically, the present invention relates to a manufacturing method of a large-size, hard resin roll for use in various kinds of industries associated with paper making, iron manufacture, fibers, magnetic recording media and the like. Especially, a resin roll according to the present invention is suitably used as a calender resin roll, to be more specific a calender resin roll for paper making.

BACKGROUND ART

A large-size, hard resin roll in the range of 300 mm to 1500 mm in outer diameter, in the range of 1500 mm to 10000 mm in face and of the order in the range of D70 to D99 in hardness (JIS K6253) has been used in various kinds of industries associated with paper making, iron manufacture, fibers, magnetic recording media and the like.

A manufacturing method of a resin roll to which the present invention is directed is basically a method including a procedure in which a synthetic resin outer cylinder molded in the shape of a cylinder is arranged so as to enclose and cover the outer surface of a metal core, a clearance formed between the metal core and the outer cylinder is filled with an adhesive, and the adhesive is hardened to integrate the constituents into one piece through bonding. A manufacturing method of a resin roll according to the procedure is disclosed in detail in Japanese Patent Publication No. 3-47359. Generally, as procedures of a manufacturing method of a resin roll, there have been known in addition to the above-mentioned method: a procedure in which a synthetic resin in a liquid state is cast around a metal core, followed by hardening; a procedure in which a tape-like long strip impregnated with a synthetic resin is wound around the outer surface of a metal core, followed by hardening; and others, to which the present invention does not relate.

The manufacturing process according to Japanese Patent Publication No. 3-47359 is effective especially for manufacturing a large-size, hard resin roll and capable of manufacturing a resin roll, excellent in compressive strength and hard to be damaged on its surface, so that actual achievements thereof have been piled up as a manufacturing method of paper making calender resin roll.

In order to prevent breakage of the outer cylinder during operation, as described in Japanese Patent Publication No. 3-47359, conventionally, it has been accepted that a hardening temperature of the adhesive for bonding the synthetic resin outer cylinder is preferably almost equal to an operating temperature of the resin roll after being manufactured, and an example is specifically shown in the publication thereof that the adhesive is hardened by heating the roll in its entirety in a heating furnace at about 60° C.

A resin roll used in the above described applications is abraded on its surface at proper time for the purpose of removing a damage having generated on the surface of the roll during operation. Abrading water is poured on the roll surface during polishing.

In a resin roll manufactured according to the conventional method, however, a small damage has been easy to be extended to a large crack, when the small damage is present on the roll surface, during polishing, especially under a low temperature condition such as in winter. In addition, there has been a case where a new crack is generated under a low temperature condition. With an enlarged crack thereon, the roll cannot be used any longer. In addition, when a fracture of the roll originating from a crack flies away during polishing, it is considerably dangerous.

It has been considered that in order to provide an adhesive layer of a roll with sufficient strength and durability, the adhesive is effectively hardened at the highest possible temperature to thereby raise a glass transition temperature of the adhesive. However, it has been found that with a rise in a hardening temperature of an adhesive, extension of a crack under a low temperature condition becomes more conspicuous.

It is therefore an object of the present invention to provide a resin roll, having sufficient adhesion strength and durability between a metal core and an outer cylinder and, in addition, suffering no cracking and not extending a damage, if any, to a large crack during polishing a surface of the roll even under a low temperature condition.

DISCLOSURE OF THE INVENTION

The present invention is basically directed to a manufacturing method of a resin roll including a procedure in which a synthetic resin outer cylinder molded in the shape of a cylinder is arranged so as to cover an outer surface of a metal core, a clearance formed between the metal core and the outer cylinder is filled with a thermoset adhesive, and the adhesive is hardened to integrate the constituents into one piece through bonding. In order to solve the above problem, integration of the constituents into one piece through bonding is performed by first hardening of the adhesive in a state where the outer cylinder is held at a first temperature, and the adhesive is thereafter heated at a second temperature higher than the first temperature for second hardening.

The present inventors pay their attention to a phenomenon that the outer cylinder after integration of the constituents into one piece through bonding shows a thermal expansion characteristic different from the outer cylinder prior to integration of the constituents into one piece through bonding. A thermal expansion characteristic of the outer cylinder after integration of the constituents into one piece through bonding is considerably influenced by a thermal expansion characteristic of the metal core. As temperature condition of the roll after integration of the constituents into one piece through bonding becomes lower, the larger an original thermal shrinkage amount of the outer cylinder prior to bonding differs from an actual thermal shrinkage amount of the outer cylinder after integration through bonding, which is considered to work as a strain therein to cause cracking. As a result of a further study, it has been found that internally generated stress of the outer cylinder after integration of the constituents into one piece through bonding is affected by a temperature of the outer cylinder in bonding.

With the first hardening of the adhesive in a state where a temperature of the outer cylinder is held at the first temperature, which is relatively low, adopted, it is considered that a difference, in a low temperature state of a resin roll, can be suppressed to a small value between an original thermal shrinkage amount of the outer cylinder of a resin roll prior to bonding and an actual thermal shrinkage amount of the outer cylinder of a resin roll after integration through bonding, and generation of a crack and extension of a crack are hard to occur even in a low temperature state during polishing the outer surface of a resin roll. In a case where an adhesive is subjected to the first hardening in a state where a temperature of the outer cylinder is held to be low, a sufficient adhesion strength and durability cannot be obtained only in the first hardening. Therefore, in a case where the adhesive is a thermoset adhesive and heated at the second temperature higher than the first temperature for the second hardening, a glass transition temperature of the adhesive can be raised, thereby enabling a sufficient adhesion strength and durability to be realized.

The first temperature is preferably a temperature lower than a resin roll temperature in operation and, for example, in the range of 10° C. to 50° C.

The second temperature is preferably a temperature higher than a resin roll temperature in operation and, for example, in the range of 60° C. to 150° C.

The first hardening of the adhesive is performed, for example, by heating the adhesive from the metal core side. In this case, the outer cylinder may be cooled from the outside in order to prevent a temperature of the outer cylinder from being raised to be higher than the first temperature.

The second hardening of the adhesive is performed, for example, by heating the resin roll as a whole.

BEST MODE FOR CARRYING OUT THE INVENTION

Figure 1A:
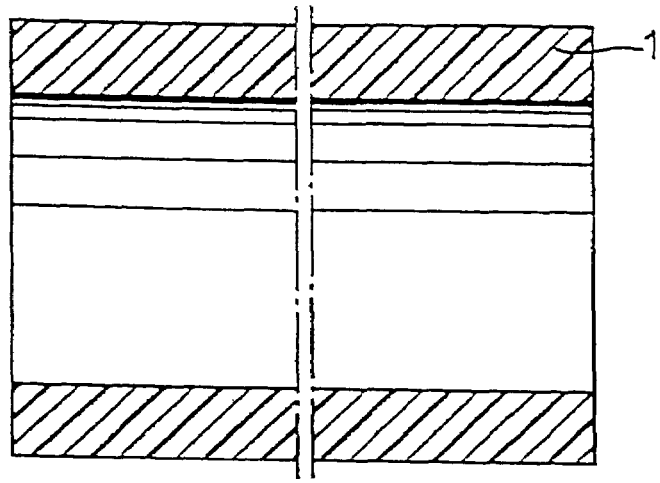
FIGS. 1A to 1C are conceptual views showing a manufacturing processes for a resin roll according to the present invention.
Figure 1B:
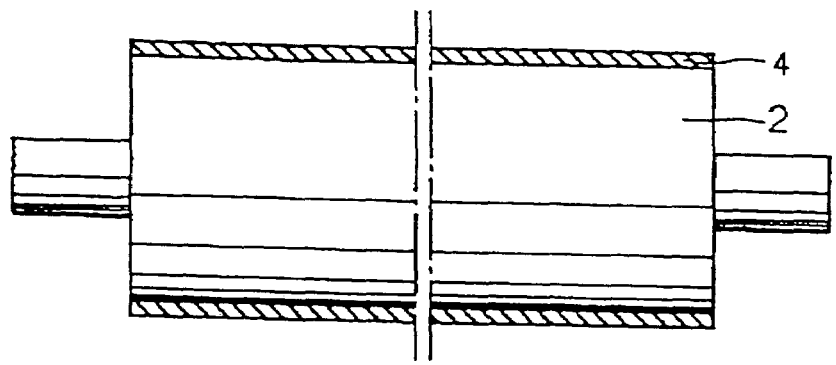
Figure 1C:
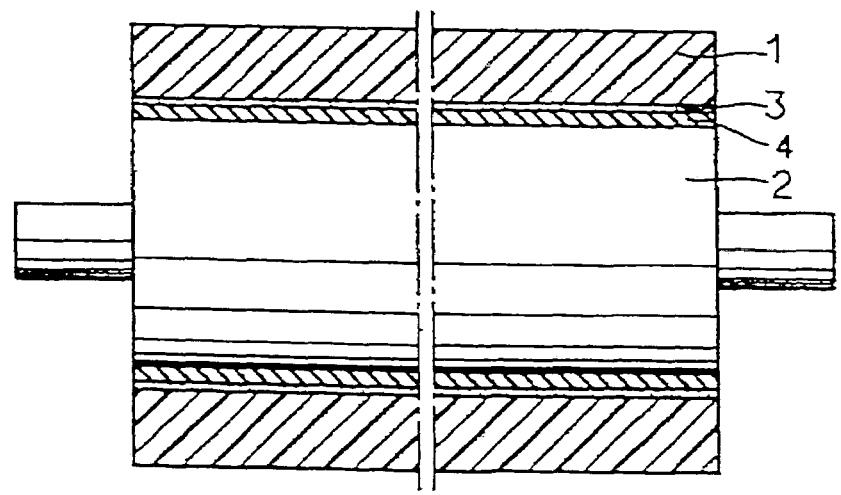

A resin roll according to the present invention is manufactured in a procedure in which as shown in FIGS. 1A to 1C, a synthetic resin outer cylinder 1 molded in the shape of a cylinder is prepared, outer cylinder 1 is arranged so as to cover a metal core 2, a clearance formed between metal core 2 and outer cylinder 1 is filled with a thermoset adhesive 3, and thermoset adhesive 3 is hardened to integrate the constituents into one piece through bonding.

Outer cylinder 1 is formed, for example, in a procedure in which a cylinder molding tool of a prescribed size is prepared, a synthetic resin starting material is cast into the mold and hardened at a prescribed temperature.

The kind of synthetic resin forming outer cylinder 1 is not particularly limited; however, examples thereof include epoxy resin, polyurethane, polyisocyanurate, cross-linked polyester amide, unsaturated polyester, diallyl phthalate resin and the like. The resins are reinforced by mixing a filler thereinto in some cases.

An under winding layer 4 is preferably formed on an outer surface of metal core 2 in order to make adhesion of outer cylinder 1 firm. Under winding layer 4 can be formed by winding fibrous material impregnated with a thermoset resin to build up the winding radially to a prescribed thickness.

In order to realize sufficient physical properties such as adhesion strength, durability and the like of adhesive 3, it is preferable to use a thermoset adhesive having a glass transition temperature higher than that of the resin roll in operation. To be more specific, it is preferable to use an adhesive having a glass transition temperature of the order in the range of 80° C. to 160° C. A cold-setting adhesive is not preferable since sufficient physical property is not obtainable. The kind of adhesive 3 is not limited as far as it is of a thermoset type; however, examples thereof include an epoxy resin adhesive, an unsaturated polyester adhesive, a diallyl phthalate resin adhesive, a polyurethane resin adhesive and the like.

Since a clearance formed between metal core 2 and outer cylinder 1 is filled with adhesive 3, adhesive 3 to be used is preferably low in viscosity. The viscosity is preferably in the range of 500 mPa·s to 5000 mPa·s (at a temperature of 35° C. to 40° C.), more preferably in the range of 1000 mPa·s to 2500 mPa·s.

When outer cylinder 1 is arranged to cover metal core 2, a filling of adhesive 3 becomes hard in an excessively small clearance formed between metal core 2 and outer cylinder 1. On the other hand, since a physical property of adhesive 3 is lower as compared to that of outer cylinder 1, a running heat is generated in adhesive layer 3 during operation of a resin roll if adhesive layer 3 is excessively thick. Hence, in a case where a clearance formed between metal core 2 and outer cylinder 1 is excessively large, running durability results in its reduction. For the reason, a clearance formed between metal core 2 and outer cylinder 1 is preferably in the range of 2 mm to 6 mm. The clearance is filled with liquid adhesive 3, and liquid adhesive 3 is hardened to integrate the constituents into one piece through bonding.

In a manufacturing method of a resin roll according to the present invention, adhesive 3 is subjected to the first hardening in a state where a temperature of outer cylinder 1 is held to be lower than a temperature of the resin roll in operation to integrate the constituents into one piece through bonding. The first hardening is preferably performed with a sufficient time, at the end of which reaction shrinkage of adhesive 3 occurs no longer. In a case of a paper making calender resin roll, the resin roll is used facing a metal heat roll, so a temperature of the resin roll in operation is raised to a temperature in the range of 60° C. to 130° C. Therefore, the first hardening is preferably performed in a state where the outer cylinder is held at a comparatively low temperature (in the range of 10° C. to 50° C., more preferably in the range of 10° C. to 40° C., still more preferably in the range of 20° C. to 35° C.). If a temperature of the outer cylinder during the first hardening is excessively high, a crack having been generated in the resin roll is easy to be extended and, furthermore, a new crack is easy to be generated when a low temperature state arises. From this reason, a temperature of the outer cylinder during the first hardening is preferably lower, but if a temperature of the outer cylinder during the first hardening is excessively low, an efficiency in hardening the adhesive decreases. Hence, a temperature of outer cylinder 1 during the first hardening is preferably set properly in the above range.

While the first hardening is usually performed by heating from the outside of outer cylinder 1, heating may also be performed only from metal core 2 side by causing a thermal medium such as warm water to pass through the interior of metal core 2 or the like without heating especially from the outside. In this case, a hardening speed of adhesive 3 can be accelerated by heating from the interior of metal core 2, thereby improving productivity.

Furthermore, the first hardening may also be performed by heating adhesive 3 from metal core 2 side in a state where cooling is intentionally performed from the outside of outer cylinder 1. In this case as well, a hardening speed of the adhesive can be accelerated by heating from the interior of metal core 2. In addition, since a rise in temperature of outer cylinder 1 under an influence of heating from the inner side is positively suppressed by cooling from the outside, a cracking preventive effect under a low temperature condition is also enhanced. The cooling from the outside can be performed by means of general methods such as air cooling, water cooling or the like.

After the first hardening, adhesive 3 is subjected to the second hardening by heating. Heating during the second hardening can be performed from the outside of the resin roll, from the interior of the metal core or from both sides. By performing the second hardening with heating, a glass transition temperature of adhesive 3 can be raised to thereby obtain sufficient physical properties such as an adhesion strength, durability and others.

For this reason, in the second hardening, it is preferable to heat adhesive 3 to a temperature higher than a temperature of the resin roll in operation. More specifically, in the second hardening, it is preferable to heat an adhesive to the temperature range of 60° C. to 150° C.

The description will be given of examples of the present invention together with a comparative example.

EXAMPLE 1

A resin roll, which is an example of the present invention, was manufactured in the following manner.

An outer surface of an iron roll core 2 of 5200 mm in length and 480 mm in diameter was sandblasted into a rough surface and an under winding layer 4 of 6.5 mm in thickness was formed on the outer surface of roll core 2. Under winding layer 4 was formed in a procedure in which a glass roving impregnated with epoxy resin into which silica powder was mixed was wound around roll core 2 and a glass cloth impregnated with similar epoxy resin was wound around the outer surface of the roving layer. The epoxy resin was hardened at 110° C.

Separately from the above operations, epoxy resin starting material into which silica powder was mixed was cast into a cylinder molding tool of a prescribed size, the epoxy resin starting material was hardened at a temperature in the range of 170° C. to 180° C., and an inner and outer diameters were mechanically processed to obtain an outer layer cylinder 1 of 540 mm in outer diameter, 501 mm in inner diameter and 5300 mm in length.

Outer layer cylinder 1 was fitted onto roll core 2 having under winding layer 4. Subsequently, an epoxy resin adhesive was cast into an annular clearance formed between under winding layer 4 and cylinder 1, and the adhesive was subjected to the first hardening in a state where cylinder 1 is held at 50° C. by heating from the outside of cylinder 1 to integrate roll core 2 on which under winding layer 4 was formed and cylinder 1 into one piece through bonding with adhesive layer 3 of 4 mm in thickness interposed therebetween and to obtain a first hardening resin roll. Then, the first hardening resin roll is heated to 80° C. to cause adhesive 3 to be subjected to the second hardening. Thereafter, the outer surface of the roll was cut and abraded to complete a resin roll of 5200 mm in length and 530 mm in diameter.

The resin roll was used as a paper making calender resin roll with the result that no problem arose as to strength or durability of adhesive layer 3 and neither generation of a crack nor extension of a crack as problems especially occurred in polishing in winter. Note that the paper making calender resin roll was used facing a heat roll at a temperature of 90° C. and paper was caused to pass through a nip formed between both rolls to thereby perform a surface treatment of paper. The resin roll in operation was at a raised temperature of about 70° C.

EXAMPLE 2

A resin roll of Example 2 according to the present invention was manufactured similarly to Example 1. A size of iron roll core 2 was set to be of 5160 mm in length and of 550 mm in diameter and a thickness of under winding layer 4 was set to be 6.5 mm. Outer layer cylinder 1 had a size of 610 mm in outer diameter, 571 mm in inner diameter and 5300 mm in length. The first hardening of an adhesive was performed in a state where a temperature of cylinder 1 was held at 40° C. and a thickness of adhesive layer 3 was 4 mm. A size of a completed resin roll has a size of 5160 mm in length and 600 mm in diameter.

The resin roll was used a as paper making calender resin roll in conditions similar to the case of Example 1 with the result that no problem arose as to strength or durability of adhesive layer 3, and neither generation of a crack nor extension of a crack as problems occurred in, polishing in winter.

EXAMPLE 3

A resin roll of Example 3 according to the present invention was manufactured similarly to Example 1. The first hardening of an adhesive was performed in a state where a temperature of cylinder 1 was held at 35° C.

The resin roll was used as a paper making calender resin roll in conditions similar to the case of Example 1 with the result that no problem arose as to strength or durability of adhesive layer 3, and neither generation of a crack nor extension of a crack as problems occurred in polishing in winter.

COMPARATIVE EXAMPLE

A resin roll of Comparative Example 1 was manufactured similarly to Example 1. However, in this case, the first hardening of an adhesive was performed in a state where a temperature of cylinder 1 was held at 60° C.

The resin roll was used as a paper making calender resin roll in conditions similar to the case of Example 1 with the result that no problem arose as to strength or durability of adhesive layer 3; however, in a state where a crack was present on the outer surface of the resin roll, the crack was largely extended in polishing in winter.

Then, comparative tests on cracking resistance of the resin rolls of Examples 1 to 3 were performed in accordance with the following method. That is, a temperature of each of the resin rolls was 10° C. and a nail of 65 mm in length and 2.5 mm in diameter was driven into the surface of a resin roll under an air pressure of 4 kg/cm$^2$ using a roll nailing machine NV65AF3 (manufactured by Hitachi Koki Co., Ltd.). As a result, as to the resin roll of Example 1, a crack was extended along an almost full circumference on the outer surface thereof. As to the resin roll of Example 2, a crack was extended on the order of about 10 cm in length along a circumference on the outer surface thereof. As to the resin roll of Example 3, no crack was extended along a circumference on the outer surface thereof. Based on the results, it can be said that reliability of cracking resistance in the resin roll of Example 3 is at the highest level and that reliability of cracking resistance in the resin roll of Example 2 was at the second highest level.

As described above, according to the present invention, since an adhesive is subjected to the first hardening to integrate constituents into one piece through bonding in a state where an outer cylinder is held at a relatively low temperature, followed by heating the adhesive to a second temperature higher than the first temperature to cause the adhesive to be subjected to the second hardening, not only can sufficient adhesion strength and durability between a metal core and the outer cylinder be obtained, but extension of a crack on the roll surface can also be prevented from generating.

Note that while description has been given of preferred examples of the present invention with reference to the accompanying drawings by way of illustration and example only, it should be understood that the present invention is not limited to the above embodiments. Needless to say that various kinds of modifications or alterations thereof can be implemented within the scope of the invention set forth in appended claims, and in addition, within the scope equivalent thereto.

Industrial Applicability

A resin roll of the present invention is used in various kinds of industries associated with paper making, iron manufacture, fibers, magnetic recording media and the like and is preferably used as a calender resin roll, to be more specific a calender resin roll for paper making, especially capable of not only obtaining sufficient adhesion strength and durability between a metal core and an outer cylinder, but also preventing extension of a crack on a roll surface from generating.

The invention claimed is:

1. A manufacturing method of a resin roll, comprising the steps of:
    positioning a synthetic resin outer cylinder (1) molded in the shape of a cylinder to cover an outer surface of a metal core (2);
    filling a clearance formed between said metal core (2) and said outer cylinder (1) with a thermosetting adhesive (3);
    performing a first hardening of said adhesive (3) by keeping said outer cylinder (1) at a first temperature to integrate the constituents into one piece through bonding; and
    performing a second hardening of said adhesive (3) by heating it at a second temperature higher than said first temperature.

2. The manufacturing method of a resin roll according to claim 1, wherein
    said first temperature is a temperature lower than a resin roll temperature in operation.

3. The manufacturing method of a resin roll according to claim 1, wherein
    said first temperature is in the range of 10° C. to 50° C.

4. The manufacturing method of a resin roll according to claim 1, wherein
    said second temperature is a temperature higher than a resin roll temperature in operation.

5. The manufacturing method of a resin roll according to claim 1, wherein
    said second temperature is in the range of 60° C. to 150° C.

6. The manufacturing method of a resin roll according to claim 1, wherein
    the first hardening of said adhesive (3) is performed by heating said adhesive from the metal core (2) side.

7. The manufacturing method of a resin roll according to claim 6, wherein
    the first hardening of said adhesive (3) is performed in a state where said outer cylinder is cooled from the outside.

8. The manufacturing method of a resin roll according to claim 1, wherein
    the second hardening of said adhesive is performed by heating said resin roll as a whole.

* * * * *